(12) United States Patent
Nomizo et al.

(10) Patent No.: US 7,364,304 B2
(45) Date of Patent: Apr. 29, 2008

(54) PROJECTOR CONTROL

(75) Inventors: Tomohiro Nomizo, Shiojiri (JP); Akira Miyasaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 310 days.

(21) Appl. No.: 11/086,393

(22) Filed: Mar. 23, 2005

(65) Prior Publication Data

US 2005/0219467 A1  Oct. 6, 2005

(30) Foreign Application Priority Data

Mar. 24, 2004  (JP) .............................. 2004-086069

(51) Int. Cl.
G03B 21/26 (2006.01)
G03B 21/20 (2006.01)
G03B 21/16 (2006.01)
H04N 5/57 (2006.01)
H04N 3/22 (2006.01)
H04N 3/26 (2006.01)
G09G 5/00 (2006.01)
G09G 3/30 (2006.01)
G09G 3/36 (2006.01)

(52) U.S. Cl. ........................ 353/30; 353/52; 353/69; 353/85; 353/94; 353/121; 348/673; 348/687; 348/745; 345/1.2; 345/1.3; 345/77; 345/101

(58) Field of Classification Search .............. 353/30, 353/31, 52, 69, 70, 85, 94, 121; 348/383, 348/673, 687, 739, 744, 745, 748; 345/1.1, 345/1.2, 1.3, 3.1, 77, 101; 349/5, 7, 8, 161
See application file for complete search history.

(56) References Cited

U.S. PATENT DOCUMENTS 6,804,406 B1 * 10/2004 Chen .......................... 382/254

| 2001/0013843 | A1* | 8/2001 | Fujiwara et al. | ............. 345/1.2 |
| 2002/0113952 | A1* | 8/2002 | Matoba et al. | ............. 353/122 |
| 2002/0159035 | A1* | 10/2002 | Koyama et al. | ............. 353/31 |
| 2003/0184714 | A1* | 10/2003 | Yamagishi | ................... 353/31 |

FOREIGN PATENT DOCUMENTS

| CN | 1447595 A | 10/2003 |
| CN | 1476242 A | 2/2004 |
| EP | 1 118 977 A1 | 7/2001 |
| JP | A-05-173107 | 7/1993 |
| JP | A-05-232428 | 9/1993 |
| JP | A-06-148624 | 5/1994 |
| JP | A-2000-163007 | 6/2000 |
| JP | A 2004-007430 | 1/2004 |
| JP | 2004-054134 | 2/2004 |

* cited by examiner

*Primary Examiner*—Rochelle Blackman
(74) *Attorney, Agent, or Firm*—Oliff & Berridge, PLC

(57) ABSTRACT

To automatically adjust the quality of a projection image commensurate with the performance in-time deterioration and aging of projector component parts in an image projection system, each projector detects an integrated service time of its own light-source lamp and a service time and temperature of a liquid-crystal panel, and sends a detection result thereof to a control unit in compliance with a request from the control unit. These parameter values are parameter values having an effect upon the quality of a projection image and varying with time. The control unit copes with the projectors depending upon the detection result received from the projectors, to set predetermined control data for use in image-quality adjustment and send the control data respectively to the projectors. Each projector controls the driving to its light-source lamp and liquid-crystal panel, depending upon the control data received from the control unit.

19 Claims, 7 Drawing Sheets

CONTROL DATA

| SUBJECT OF CONTROL | LOOKUP TABLE | LAMP POWER |
|---|---|---|
| 100[1] | LUT1 | 0% |
| 100[2] | LUT1 | -5% |
| 100[3] | LUT2 | -5% |
| 100[4] | LUT2 | -10% |

FIG. 4

PROJECTOR CONTROL

BACKGROUND

Exemplary aspects of the present invention relate to a technology to control a projector and, more particularly, to automatically adjust the quality of an image to be projected by a projector.

In related art projectors that project an image with magnification onto a screen, deterioration takes place in image qualities, such as brightness, contrast ratio and color balance, due to the in-time deterioration and aging of performance in such component parts as the illumination system, e.g., light-source lamp and the display device, e.g., liquid-crystal panel. Consequently, various technologies have been proposed which automatically adjust the quality of images projected (hereinafter, projection images) in accordance with the performance in-time deterioration and aging of the projector component parts. See JP-A-6-148624, JP-A-5-232428 and JP-A-5-173107. For example, JP-A-6-148624 describes a technique to regulate the color temperature of a liquid-crystal projector commensurate with the lit time of a light-source lamp.

So-called multi-screen systems are in use which project images by use of a plurality of projectors. Such multi-screen systems include a system to project the same image or related images separately by use of a plurality of projectors at a presentation hall for example, and a system to project the whole image by segmenting one image and projecting the divisional images in an arrangement form through use of separate projectors.

SUMMARY

In the multi-screen system, where an image is projected by use of a plurality of projectors, variations often occur in the quality of projection images due to the presence of variations in the performance of in-time deterioration and aging of components between the projectors. For this reason, there is a need to collectively adjust the quality of images projected by a plurality of projectors. Particularly, for the foregoing system to project the whole image by segmenting one image and projecting the divisional images in an arrangement form through use of separate projectors, there is a desire to make the projection images consistent in their image qualities. With the technique described in the above related art documents, projection-image quality can be adjusted on each projector. However, in the technique described in the above related art documents, there is a difficulty in collectively adjusting the qualities of the projection images because of lack in consideration to the variations in projection-image quality between the plurality of projectors.

Exemplary aspects of the present invention address and/or solve the above and/or other problems, and make an automatic adjustment on the quality of a projection image in accordance with the performance in-time deterioration and aging of the projector component parts, in an image projection system having projectors to project images and a control unit to control the projectors.

Exemplary embodiments address or solve the above by employing the following structure.

An image projection system of an exemplary aspect of the invention includes an image projection system having a projector to project an image and a control unit to control the projector. The projector includes:

a parameter transmitting section to send to the control unit, a predetermined parameter value having an effect upon a quality of the image projected and varying with time; a control data receiving section to receive, from the control unit, predetermined control data for use in adjusting the image quality; and a control section to carry out predetermined control to adjust the image quality depending upon the control data. The control unit includes: a parameter receiving section to receive the parameter value from the projector; a control data setting section to set the control data depending upon the parameter value; and a control data transmitting section to transmit the control data to the projector.

The quality of a projection image includes brightness, contrast ratio and color balance. The parameters having an effect upon those and varying with time are parameters concerning the performances of projector's components, e.g., illumination system and display device, which parameters are related to the brightness and color reproducibility of light exiting the projector. For the liquid-crystal projector, such parameters include brightness and emission spectrum of a light-source lamp, transmissivity of a liquid-crystal panel, and characteristics of various optical parts, such as a filter, a mirror and a lens. Furthermore, there are included service time, temperature and humidity which have an effect upon those. The parameter values are to be detected by various sensors.

The control data setting section may set control data by use of a table describing a correspondence relationship between a previously prepared parameter value and control data, or may set control data by a predetermined operation. Alternatively, both ways may be used in combination.

The control data is not necessarily set to enhance the quality of a projection image. For example, it may be set to lower the brightness or contrast ratio of a projection image, as required.

In exemplary aspects of the invention, the quality of a projection image can be automatically adjusted in accordance with a performance in-time deterioration and aging of projector component parts. Particularly, where the image projection system has the projectors in plurality, the projection images by the plurality of projectors can be adjusted in quality in a collective fashion.

In the image projection system, although various items can be taken as subjects of adjustment as to image quality adjustment, the image quality includes at least one of brightness and contrast ratio of the image.

The performance in-time deterioration and aging of projector component parts have a great effect upon brightness and contrast ratio of a projection image. Accordingly, by taking these items as subjects of adjustment, image quality can be effectively adjusted on a projection image. Besides those items, various items may be taken as subjects of adjustment, including color balance, gamma correction, white level correction and black level correction.

In the image projection system of an exemplary aspect of the invention, the projector is a liquid-crystal projector which includes an image processing section to perform a predetermined image processing on input image data, a liquid-crystal panel to form an image depending upon the image data on which the image processing has been performed, and a light-source lamp for use in projecting the formed image. The parameter transmitting section sends the parameter value to at least one of the liquid-crystal panel and the light-source lamp. The control section effects the control by controlling driving to at least one of the image processing section and the light-source lamp, depending upon the control data.

In the liquid-crystal projector, among the constituent components, the liquid-crystal panel and light-source lamp have greater in-time deterioration and aging than the other constituent components. Accordingly, exemplary aspects of the invention can effectively adjust the quality of a projection image of the liquid-crystal projector.

In an exemplary aspect of the invention, the control data setting section can set control data in various forms. The control data setting section is not limited to the form to set control data to control the drive to the image processing section depending upon the parameter value as to the liquid-crystal panel, or to set control data to control the drive to the light-source lamp depending upon the parameter value as to the light-source lamp. The control data setting section may set control data to control the drive to the image processing section depending upon the parameter value as to the light-source lamp. It may set control data to control the drive to the light-source lamp depending upon the parameter value as to the liquid-crystal panel.

In the image projection system, the parameter value can use a parameter value having a direct effect upon the quality of a projection image, e.g., liquid-crystal panel transmissivity and light-source lamp brightness.

However, the parameter value can include at least one of a service time of a liquid crystal panel, a temperature of a liquid-crystal panel, a service time of a light-source lamp and a temperature of a light-source lamp.

It is possible to previously, empirically provide a correspondence to the relationship between a liquid-crystal panel service time and liquid-crystal panel temperature and a liquid-crystal panel transmissivity and to the relationship between a light-source lamp service time and light-source lamp temperature and a light-source lamp brightness and emission spectrum. Liquid-crystal panel service time, liquid-crystal panel temperature, light-source lamp service time and light-source lamp temperature can be easily detected by use of a timer, temperature sensor and the like. Such detection is easier rather than detecting a liquid-crystal panel transmissivity or light-source lamp brightness. Accordingly, exemplary aspects of the invention can adjust a projection image by a comparatively simple structure.

In the image projection system having the liquid-crystal projector, the image processing section can have a plurality of lookup tables for use in image processing and capable of carrying out image processing by selecting at least one of the plurality of lookup tables, the control data including data to select the lookup table.

The lookup table refers to a table to correct for an intensity level value of inputted image data. Exemplary aspects of the invention can easily adjust the quality of a projection image.

In the image projection system having the liquid-crystal projector, the control data can include data to adjust a drive power to the light-source lamp.

This can readily adjust the brightness of a projection image.

In the image projection system of an exemplary aspect of the invention, in the case the image projection system has the projectors in plurality, the control data setting section sets the respective ones of control data corresponding to the projectors, and the control data transmitting section sends the respective ones of control data to corresponding ones of the projectors.

In an exemplary aspect of the invention, because the control data setting section sets control data while taking account of variations in the quality of projection images depending upon a plurality of parameter values received respectively from a plurality of projectors, the projection images by the plurality of projectors can be adjusted in image quality in a collective fashion.

In the image projection system, the control data setting section may set the control data such that the images projected by the projectors become equal in image quality one to another.

This makes it possible to suppress the variations in quality between the projection images by the projectors. In case the invention is applied to an image projection system to project the whole image by image projection through segmenting one image and projecting the divisional images in an arrangement form with use of separate projectors, the whole image can be enhanced in quality. This is particularly effective.

In the image projection system having the projectors in plurality, the control unit may further include a request signal transmitting section to send, to each of the projectors, a request signal to request to send the parameter value, each of the projectors further having a request signal receiving section to receive the request signal, the parameter transmitting section sending the parameter value upon receiving the request signal.

In this case, the projector detects a parameter value in accordance with receiving a request signal from the control unit. This enables the control unit to set control data depending upon the parameter values detected nearly in the same timing at the projectors. Accordingly, this can enhance the accuracy in image-quality adjustment of a projection image.

In the image projection system, the request signal transmitting section can further send the request signal at a predetermined time interval.

This makes it possible to carry out an image adjustment at any time during operation of the image projection system. The time interval of sending the request signals can be desirably set by the image projection system or the user of the control unit.

Exemplary aspects of the invention include a control unit for use in the image projection system explained before.

Specifically, an exemplary aspect of the invention includes a control unit to control a projector to project an image, the control unit including: a parameter receiving section to receive, from the projector, a predetermined parameter value having an effect upon an image quality of the image projected and varying with time; a control data setting section to set predetermined control data for use in adjusting the image quality at the projector, depending upon the parameter value; and a transmitting section to send the control data to the projector.

The control unit of an exemplary aspect of the invention can realize the image projection system explained before.

An exemplary aspect of the invention includes a projector for use in the image projection system explained before.

Specifically, a first projector of an exemplary aspect of the invention includes: a projector to project an image; a parameter transmitting section to send, to a predetermined control unit, a predetermined parameter value having an effect upon an image quality of the image projected and varying with time; a control data receiving section to receive predetermined control data for use in adjusting the image quality from the control unit; and a control section to effect predetermined control to adjust the image quality depending upon the control data.

Exemplary aspects of the invention include a projector having a function to set control data of the control unit explained before.

Specifically, a second projector of an exemplary aspect of the invention includes: a projector to project an image; a parameter receiving section to receive, from another projector, a predetermined parameter value having an effect upon an image quality of the image projected and varying with time; a control data setting section to set predetermined control data for use in adjusting the image quality at least at one of the other projector and the relevant projector, depending upon the parameter value received from the other projector and the parameter value of the relevant projector; a control section to effect predetermined control to adjust the image quality depending upon the control data corresponding to the relevant projector; and a control data transmitting section to send a corresponding one of the control data to the other projector.

By doing so, the second projector of an exemplary aspect of the invention can be applied in place of the control unit explained before in the image projection system. Accordingly, system structure can be simplified in the image projection system to project an image by use of a plurality of projectors.

Exemplary aspects of the invention need not have the foregoing various features but can be configured by omitting a part thereof or by a suitable combination thereof. Exemplary aspects of the invention can be configured as a method to control the image projection system, the control unit and the projector besides the structure as an image projection system, a control unit or a projector. Realization is possible in various forms including a computer program, a recording medium recording the program, and a data signal including the program and embodied in a carrier wave. In each form, the foregoing various additional elements can be applied.

Exemplary aspects of the invention, where configured as a computer program or a recording medium recorded with the program etc., can be configured as a control unit or a program entirely to control the operation of the projector or configured for only a part having a function of an exemplary aspect of the invention. The recording medium can utilize various mediums to be read by the computer, including a flexible disk, a CD-ROM, a DVD-ROM, a magneto-optical disk, an IC card, a ROM cartridge, a punch card, a printing matter printed with codes, such as a barcode, a computer internal storage device (memory, such as RAM or ROM) and an external storage device.

BRIEF DESCRIPTION OF THE DRAWINGS

FIG. 4 is a schematic showing an example of control data;

DETAILED DESCRIPTION OF EXEMPLARY EMBODIMENTS

A. First Exemplary Embodiment

A1. Image Projection System

Figure 1:
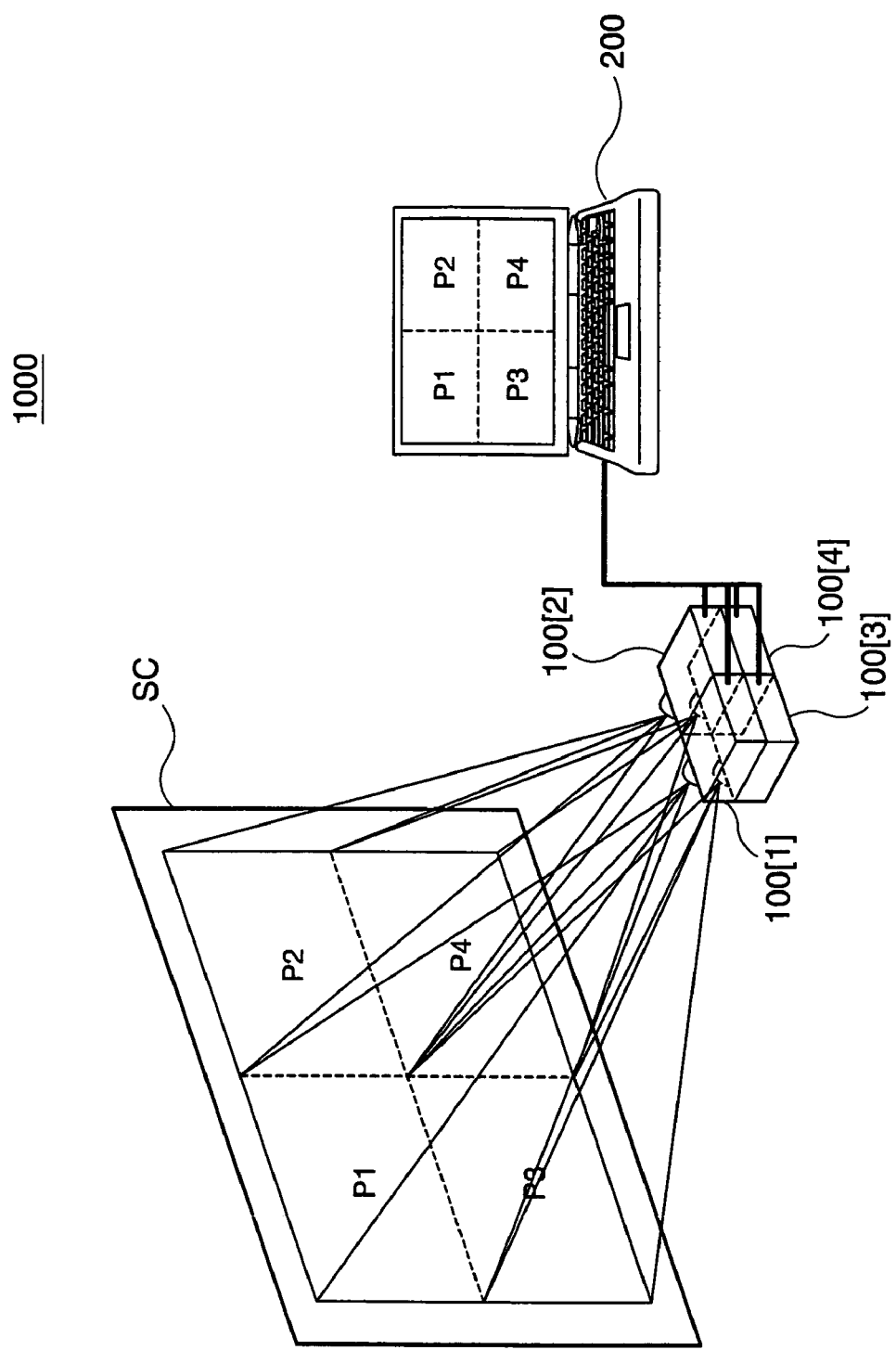
FIG. 1 is a schematic showing an arrangement of an image projection system 1000 as a first exemplary embodiment.

FIG. 1 is a schematic showing an arrangement of an image projection system 1000 as a first exemplary embodiment. The image projection system 1000 includes a personal computer 200, and four liquid-crystal projectors 100[1]-100[4] (hereinafter, these are collectively referred to as a projector 100) connected to the personal computer 200. The image projection system 100 is a system where an image to be projected is divided into four image segments P1-P4 by the personal computer 200 so that those can be projected as a whole image onto a screen SC by use of the four projectors 100, as shown in the figure. Note that although this exemplary embodiment explains an example of a multi-screen system using the four projectors 100, the projectors 100 may be one or more in number.

In the image projection system 1000 of this exemplary embodiment, each projector 100 detects an integrated service time of a light source lamp arranged thereon and a service time and temperature of its liquid-crystal panel at the request of the computer 200, and sends a detection result thereof to the personal computer 200. These parameter values are to have an effect upon the quality of a projection image and vary with time. The personal computer 200 copes with the projectors 100 depending upon the detection result received from the projectors 100 and sets predetermined control data for use in image-quality adjustment, thus sending the control data to the corresponding ones of the projectors 100. The projectors 100 effects control of the driving to their light-source lamps and liquid-crystal panels depending upon the control data received from the personal computer 200. The personal computer 200 corresponds to a control unit of an exemplary aspect of the invention. Hereinafter, the personal computer 200 is referred also to as a control unit 200.

A2. Projector Structure

Figure 2:
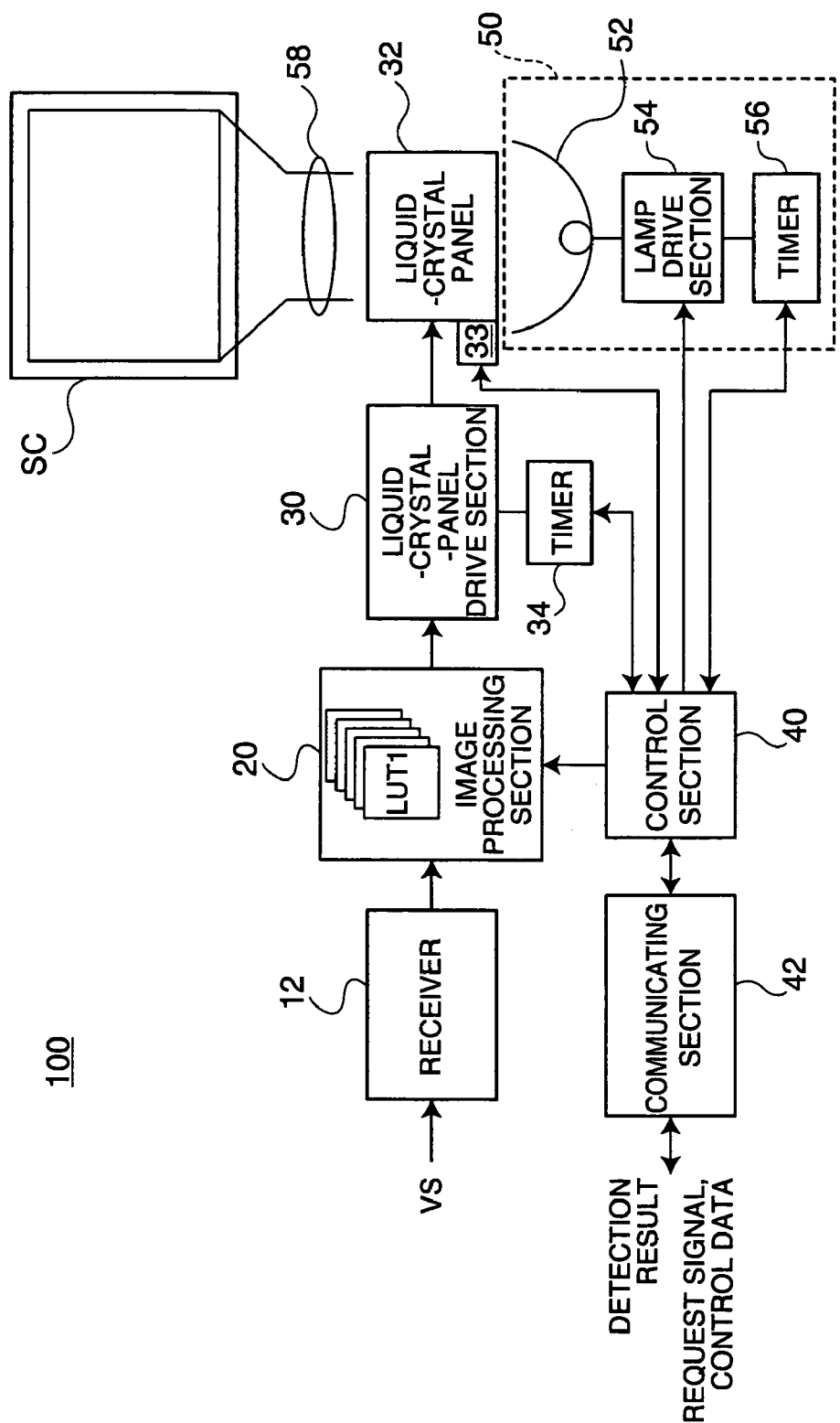
FIG. 2 is a schematic showing a configuration of a projector 100.

FIG. 2 is a schematic showing a configuration of the projector 100. As shown in the figure, the projector 100 includes a receiver 12, an image processing section 20, a liquid-crystal panel drive section 30, a liquid-crystal panel 32, a liquid-crystal-panel timer 34 to integrate a service time of liquid-crystal panel 32, a control section 40 and a communicating section 42. A temperature sensor 33, to detect a temperature of liquid-crystal panel 32, is provided on the liquid-crystal panel 32. The projector 100 further has an illuminator 50 to illuminate the liquid-crystal panel 32, and a projection system 58 to throw the light transmitted through the liquid-crystal panel 32 onto the screen SC.

The receiver 12 is to input therein an image signal VS supplied from the personal computer 200 and converts it into image data in a form to be processed by the image processing section 20. The image signal VS may be an analog image signal or a digital image signal.

The image processing section 20 is to make various image processes including image-quality adjustments, such as intensity-level adjustment, color balance adjustment, contrast adjustment and sharpness adjustment, image size-magnifying/reducing process, and trapezoidal distortion correction upon carrying out a swing-projection by the projector 100, on the image data inputted through the receiver 12. The image processing section 20 has a plurality of lookup tables LUTs on each color of R (red), G (green) and B (blue), and selects at least one out of the plurality of lookup tables LUT on each color to thereby use it in image-quality adjustment. The lookup table refers to a table to correct for an intensity-level value of inputted image data. By switching it over, adjustment can be effected as to brightness, color balance, contrast ratio, etc. for an image to form on the liquid-crystal panel 32. The lookup table LUT can be switched over in accordance with a signal from the control section 40. This makes it possible to readily adjust the image-quality for a projection image. Note that, although this exemplary embodiment was to switch over the plurality of lookup tables LUTs, one lookup table LUT may be used with correction. In place of the lookup tables LUTs, a predetermined function may be used.

The liquid-crystal-panel drive section 30 generates a drive signal to drive the liquid-crystal panel 32, on the basis of the image data processed in the image processing section 20.

The liquid-crystal panel 32 modulates the illumination light according to the drive signal generated by the liquid-crystal panel drive section 30. The liquid-crystal panel 32 is a transmission liquid-crystal panel for use as a light valve (light modulator) to modulate the illumination light emitted from the illuminator 50.

The illuminator 50 has a light-source lamp 52, a lamp drive section 54, a light-source-lamp timer 34 to integrate a service time of light-source lamp 52. In this exemplary embodiment, an ultra-high mercury lamp may be used as a light-source lamp 52. The light-source lamp 52 may employ another sort of discharge lamp, e.g., a metal halide lamp or a xenon lamp.

The lamp drive section 54 changes the lamp power in compliance with a value set by the control section 40, to thereby drive the light-source lamp 52. The lamp drive section 54 can readily control the brightness of illumination light emitted from the light-source lamp 52 or the brightness of a projection image by adjusting the lamp power.

Although not shown, the projector 100 has three liquid-crystal panels 32 for RGB three colors. Each section has a function to process image data in an amount of three colors. The illuminator 50 has a color separation system to separate white light into three colors of light. The projection system 58 has a combining system to combine three colors of image light and generating image light representative of a color image.

The communicating section 42 exchanges various data with the control unit 200. The communicating section 42 sends, to the control unit 200, an integrated service time of liquid-crystal panel 32 detected by the liquid-crystal-panel timer 34, a temperature of liquid-crystal panel 32 detected by the temperature sensor 33, and an integrated service time of light-source lamp 52 detected by the light-source-lamp timer 56. The communicating section 42 receives, from the control unit 200, an integrated service time of liquid-crystal panel 32, a temperature of liquid-crystal panel 32, a request signal to send an integrated service time of light-source lamp 52, and control data, referred later. The communicating section 42 corresponds to a parameter transmitting section, a request-signal receiving section and a control data receiving section of an exemplary aspect of the invention.

The control section 40 places the image processing section 20 and lamp drive section 54 under control according to the operations of a not-shown remote control and of operating buttons provided on the projector 100 main body. Specifically, the control section 40 is to set various parameter values and lamp power to be used in the image processing section 20. The control section 40 acquires detection results respectively from the temperature sensor 33, the liquid-crystal-panel timer 34 and the light-source-lamp timer 56, according to a request signal received from the control unit 200. The control section 40 generates a signal to switch over the lookup table LUT depending upon the control data received from the control unit 200, and outputs it to the image processing section 20. Besides, it establishes a lamp power and outputs a setting value thereof to the lamp drive section 54.

A3. Control Unit Configuration

Figure 3:
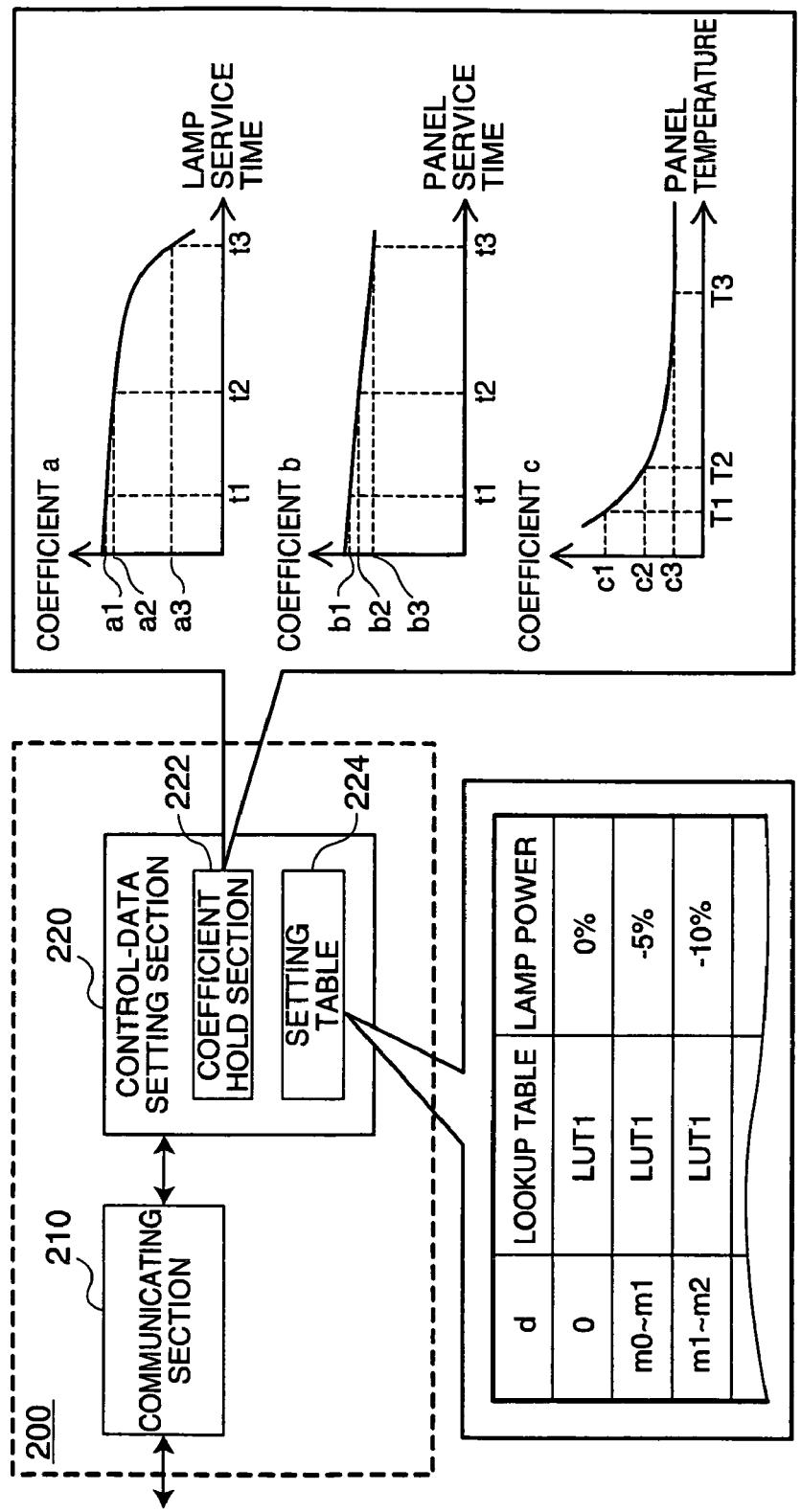
FIG. 3 is a schematic showing a configuration of a control unit 200.

FIG. 3 is a schematic showing a configuration of the control unit 200. The functional blocks shown are configured on software, by installing a predetermined computer program onto the CPU, the memory or the personal computer 200 having an external storage device. At least part of these functional blocks may be configured on hardware. The personal computer 200 is to serve as the control unit 200 in case the CPU executes the program on the memory.

The communicating section 210 exchanges various data with the projectors 100. The communicating section 210 receives, from the projector 100 for example, a detection result of an integrated service time of liquid-crystal panel 32 of the projector 100, a temperature of liquid-crystal panel 32 and an integrated service time of light-source lamp 52. The received detection result is placed under correspondence to the respective projectors 100 and held in the memory. The communicating section 210 sends, to the projector 100, a request signal to send the detection result and control data. The communicating section 210 corresponds to a parameter receiving section, a request-signal transmitting section and a control-data transmitting section of an exemplary aspect of the invention.

The control-data setting section 220 has a coefficient hold section 222 and a setting table 224. The control-data setting section 220 looks up the coefficient hold section 222 and setting table 224, and establishes control data corresponding thereto depending upon a detection result received from the respective projectors 100. In the present exemplary embodiment, the control data may be established to control the switching of the lookup table LUT for the projector 100 and the lamp power to the light-source lamp 52. There is typically shown, in the figure, the detail of the coefficient hold section 222 and the setting table 224.

The coefficient hold section 222 holds information representative of a relationship between an integrated service time of light-source lamp 52 and a coefficient-a, information representative of a relationship between an integrated service time of liquid-crystal panel 32 and a coefficient-b, and information representative of a relationship between a temperature of liquid-crystal panel 32 and a coefficient-c. The relationship between an integrated service time of light-source lamp 52 and a coefficient-a corresponds to a relationship between an integrated service time of light-source lamp 52 and a luminance on the light-source lamp 52. The relationship between an integrated service time of liquid-crystal panel 32 and a coefficient-b corresponds to a relationship between an integrated service time of liquid-crystal panel 32 and a transmissivity of the liquid-crystal panel 32. The relationship between a temperature of liquid-crystal panel 32 and a coefficient-c corresponds to a relationship between a temperature of liquid-crystal panel 32 and a transmissivity of the liquid-crystal panel 32.

The control-data setting section 220 looks up the coefficient hold section 222 depending upon a detection result received from the projectors 100, and calculates respective coefficients D. The coefficient D is a product of a coefficient-a, a coefficient-b and a coefficient-c (D=a×b×c). For example, in the case that the light-source lamp 52 of a certain projector 100 has an integrated service time t2, the liquid-crystal panel 32 has an integrated service time t3 and the liquid-crystal panel 32 has a temperature T1, then the coefficient-a, the coefficient-b and the coefficient-c are respectively a2, b3 and c1 as known from the figure. Thus, the coefficient D for the relevant projector 100 is given D=a2×b3×c1.

Then, the control-data setting section 220 specifies a minimal coefficient Dmin out of a plurality of coefficients D calculated and calculates, for each projector 100, a difference d between the coefficient D and Dmin (=D−Dmin). The control-data setting section 220 looks up the setting table 224 as to projector 100 depending upon the difference d, and sets control data respectively.

The setting table 224 is described with a corresponding relationship between a difference d between a coefficient D and the minimal coefficient Dmin, a lookup table name and a lamp power. As for lamp power, there is described a correction ratio relative to a reference value. For example, for d=0, i.e., the projector 100 whose calculated coefficient D is a minimal coefficient Dmin, it is shown to carry out an image process by use of a lookup table "LUT1" and thereby set a lamp power to "reference value". For the projector 100 having d=m0−m1, it is shown to carry out an image process by use of a lookup table "LUT1" and thereby set a lamp power to "reference value—5%". The setting table 224 is set such that, when the projectors 100 have switched over the lookup table LUT and placed lamp power under control according to the corresponding control data, the resulting projection images have nearly equal brightness and contrast ratio one to another.

FIG. 4 is a schematic showing an example of control data. As shown in the figure, in this exemplary embodiment, control data includes a name of a lookup table to be selected and a correction ratio relative to a reference value of lamp power, for each projector 100 to be placed under control. In the illustrated exemplary embodiment, the control data corresponding to the projector 100[1] is to set the lookup table LUT to "LUT1" and the lamp power to "reference value". The control data corresponding to the projector 100[2] is to set the lookup table LUT to "LUT1" and the lamp power to "reference value—5%". The control data corresponding to the projector 100[3] is to set the lookup table LUT to "LUT2" and the lamp power to "reference value—5%". The control data corresponding to the projector 100[4] is to set the lookup table LUT to "LUT2" and the lamp power to "reference value—10%".

In the image projection system 1000 of this exemplary embodiment, each projector 100 switches over the lookup table LUT and controls lamp power depending upon established control data, as explained above. This makes it possible to collectively adjust the image quality of the projection images given by the respective projectors 100. Furthermore, the projection images by the projectors 100 can be suppressed against the variations in image quality.

A4. Image-Quality Adjustment Process

Figure 5:
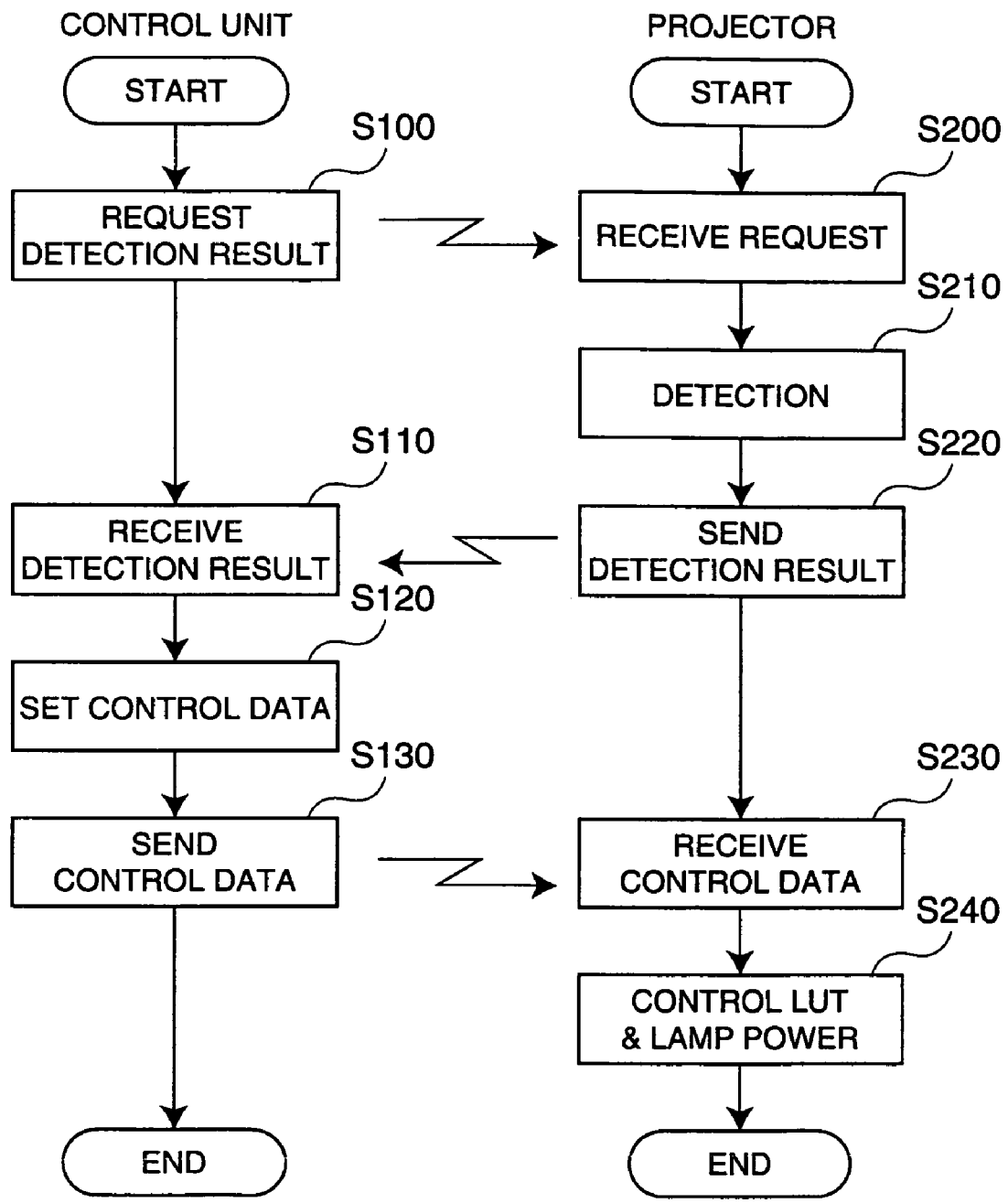
FIG. 5 is a flowchart showing a flow of image-quality adjustment process.

FIG. 5 is a flowchart showing a flow of image-quality adjustment process. In the left of the figure, there is shown a process at the control unit 200. In the right of the figure, there is shown a process at the projector 100.

At first, the control unit 200 sends, nearly simultaneously to the projectors 100, a request signal to send a detection result of an integrated service time of liquid-crystal panel 32 of the projector 100, a temperature of liquid-crystal panel 32 and an integrated service time of light-source lamp 52 (step S100).

Receiving the request signal from the control unit 200 (step S200), each projector 100 detects an integrated service time of liquid-crystal panel 32, a temperature of liquid-crystal panel 32 and an integrated service time of light-source lamp 52 (step S210), and sends the detection result to the control unit 200 (step S220).

Receiving the detection results from the projectors 100 (step S110), the control unit 200 establishes control data as explained before (step S120). Then, the control unit 200 sends the control data thus set to the corresponding projector 100 (step S130).

Receiving the control data (step S230), each projector 100 switches over the lookup table LUT and lamp power and thereby controls the driving to the image processing section 20 and light-source lamp 52 depending upon the control data (step S240). For example, in the case with the control data shown in FIG. 4, the projector 100[1] sets the lookup table LUT to "LUT1" and lamp power to "reference value". The projector 100[2] sets the lookup table LUT to "LUT1" and lamp power to "reference value—5%". The projector 100[3] sets the lookup table LUT to "LUT2" and lamp power to "reference value—5%". The projector 100[4] sets the lookup table LUT to "LUT2" and lamp power to "reference value—10%". The projector 100, when completed the setting of lookup table and lamp power, terminates the image-quality adjustment process.

In this manner, the projectors 100 detect respective parameter values according to the request signals sent nearly simultaneously from the control unit 200, whereby the control unit 200 is allowed to make a setting of control data depending upon the parameter values detected in nearly the same timing at the respective projectors. Accordingly, the accuracy of image-quality adjustment can be enhanced for a projection image.

The image-quality adjustment process is executed at a predetermined time interval. The time interval can be desirably set by the user of the image projection system 1000. By doing so, image-quality adjustment can be conducted at an appropriate time during operation of the image projection system 1000.

According to the image projection system 1000 in the first exemplary embodiment explained above, automatic adjustment of the image quality of projection images can be collectively implemented in compliance with a performance in-time deterioration and aging of the liquid-crystal panel 32 and light-source lamp 52.

B. Second Exemplary Embodiment

B1. Image Projection System

Figure 6:
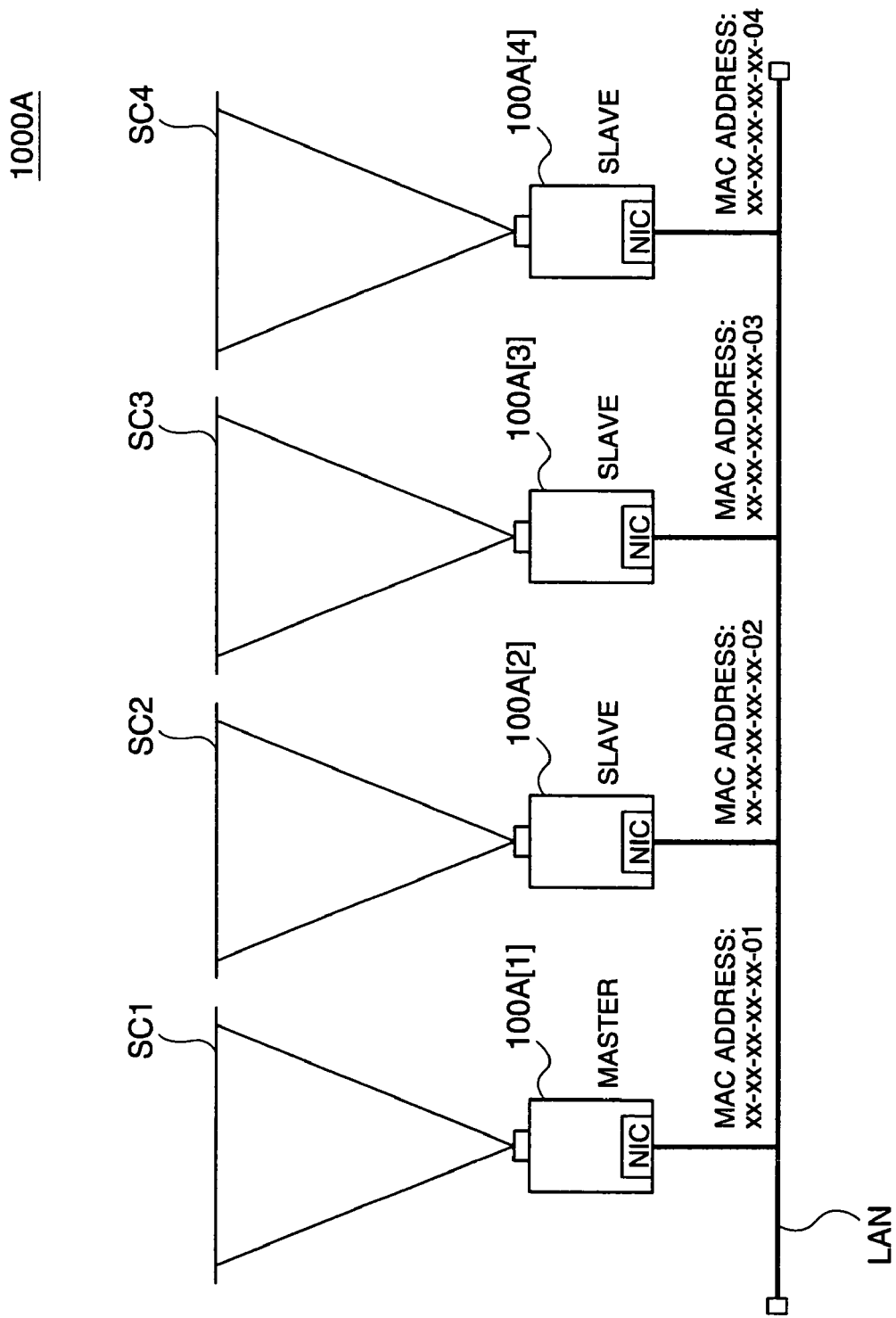
FIG. 6 is a schematic showing an arrangement of an image projection system 1000A as a second exemplary embodiment.

FIG. 6 is a schematic showing an arrangement of an image projection system 1000A as a second exemplary embodiment. The image projection system 1000A includes four liquid-crystal projectors 100[1]-100[4] (hereinafter, collectively referred to as projectors 100A). The projectors 100A are mutually connected together through a local area network LAN. The local area network LAN is connected with a not-shown image-data output device. The projectors 100A project images onto screens SC1-SC4 depending upon the image data supplied from the image-data output device.

Each projector 100A has a NIC (network interface card) for connection to the local area network LAN. Each NIC is assigned with a MAC address as an identification number unique thereto. In this exemplary embodiment, the projector 100A assigned with a MAC address, minimal in number of among the four projectors 100A, operates as a master. The projectors 100A other than the master are to operate as slaves. In the illustrated exemplary embodiment, the projector 100A[1] minimal in MAC address number is to operate as a master while the projectors 100A[2]-100A[4] are to operate as slaves. The projector 100A[1] takes control of image-quality adjustment on the projectors 100A[2]-100A[4] and of image-quality adjustment on its own. Specifically, the projector 100A for operation as a master has a function as a control unit 200 of the first exemplary embodiment besides the function to project an image.

B2. Projector Configuration

Figure 7:
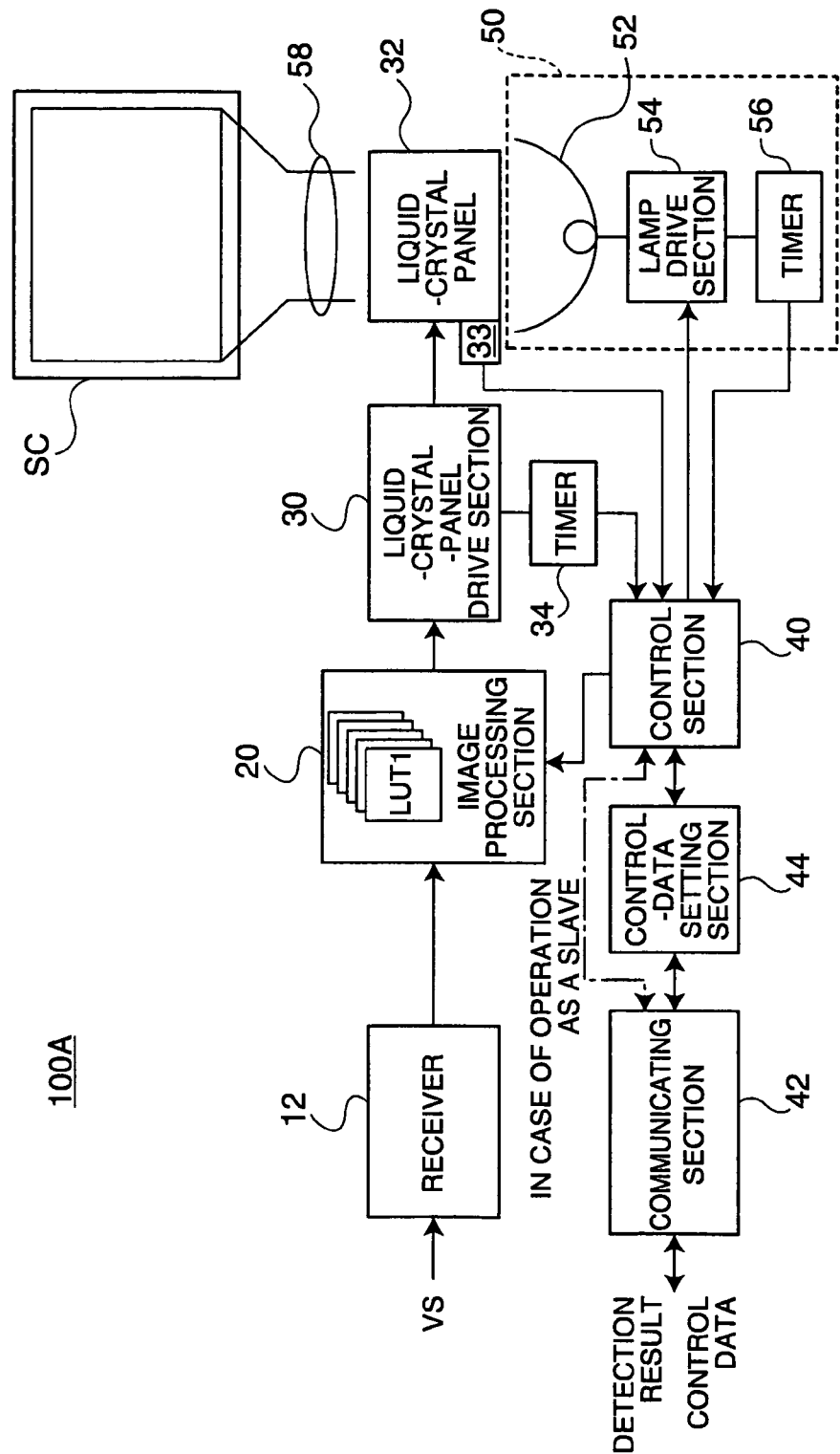
FIG. 7 is a schematic of a projector 100A in the second exemplary embodiment.

FIG. 7 is a schematic showing a configuration of a projector 100A in a second exemplary embodiment. The projector 100A is similar to the projector 100 of the first exemplary embodiment except in that having a control-data setting section 44. The control-data setting section 44 provides the same function as the control-data setting section 220 of the control unit 200 of the first exemplary embodiment. Furthermore, the control-data setting section 44 is to set control data of its own.

Note that the projector 100A[1] for operation as a master is to cause the control-data setting section 44 to operate whereas the projectors 100A[2]-100A[4] for operation as slaves are not to operate the control-data setting section 44. Specifically, concerning the projectors 100A[2]-100A[4] for operation as slaves, data exchange is directly made between the communicating section 42 and the control section 40 as shown by the one-dot chain line in the figure. How to set control data in the projector 100A[1] for operation as a master is similar to that of the first exemplary embodiment.

B3. Image-Quality Adjustment Process

The flow of image-quality adjustment process in the second exemplary embodiment is nearly similar to that of the first exemplary embodiment. The process at the control unit 200 shown in FIG. 5 is to be executed by the projector 100A[1] for operation as a master while the process at the projector 100 is to be executed by the projectors 100A[2]-100A[4] for operation as slaves. The projector 100A[1], at step S120 in FIG. 5, establishes control data corresponding to the projectors 100A[2]-100A[4] and its own control data. After the step S130 in FIG. 5, the projector 100A[1] switches over its own lookup table LUT and lamp power depending upon control data, to effect control of the image processing section 20 and light-source lamp 52.

According to the image projection system 1000A explained in the above, automatic adjustment of projection image quality can be collectively implemented in compliance with a performance in-time deterioration and aging of the liquid-crystal panel 32 and light-source lamp 52, similarly to the image projection system 1000 of the first exemplary embodiment. In the present exemplary embodiment, because the projector 100A has a function to establish control data, the projector 100A can be applied in place of the control unit 200 of the first exemplary embodiment. Accordingly, system arrangement can be simplified in an image projection system to project an image through use of a plurality of projectors.

C. Modifications

Although exemplary aspects of the present invention were explained as to exemplary embodiments, the invention is not limited to such exemplary embodiments and can be practiced on various forms within the scope not departing from the gist thereof. For example, the following modifications are feasible.

C1. Modification 1

The foregoing exemplary embodiment used an integrated service time of liquid-crystal panel 32, temperature of liquid-crystal panel 32 and integrated service time of light-source lamp 52, as parameters having an effect upon projection image quality and changing chronologically. However, it is satisfactory to use at least one of those. Besides, other parameters may be used, e.g., luminance and emission spectrum of light-source lamp 52, transmissivity of liquid-crystal panel 32, characteristics of various optical components, such as a filter, a mirror and a lens. Furthermore, it is possible to use such a service time, temperature and humidity as having effects upon those.

C2. Modification 2

The foregoing exemplary embodiment was to establish control data depending upon an integrated service time of liquid-crystal panel 32, a temperature of the liquid-crystal panel 32 and an integrated service time of light-source lamp 52. However, this is not limitative. The liquid-crystal panel 32 and the light-source lamp 52 undergo deteriorates due to aging under the influence of the service conditions thereof. Accordingly, the accuracy of projection image-quality adjustment can be enhanced by establishing control data while taking account of a service history, e.g., at what temperature and for what hours the liquid-crystal panels was used, or at what lamp power and for what hours the light-source lamp 52 was used.

C3. Modification 3

In the above two exemplary embodiments, control data was established in a manner such that the projection images by the projectors 100 are nearly equal in image quality one to another. However, this is not limitative. For example, control data may be set such that the projectors 100 have a predetermined image quality. Such a form includes a form of automatic adjustment to increase the brightness of a plurality of projection images phase by phase.

C4. Modification 4

In the above two exemplary embodiments, the projector 100A assigned with the smallest number was allowed to operate as a master. However, this is not limitative. For example, the projector 100A assigned with the greatest number may be taken as a master. In deciding a master, IP address may be used in place of MAC address. Otherwise, the master and slaves may be decided by user's operation of a predetermined switch provided on the projector 100A. The projector 100A may be used as a master while the projectors 100 of the first embodiment be used as slaves.

C5. Modification 5

The foregoing exemplary embodiments explained on the cases that the liquid-crystal projectors were applied as image projection systems 1000, 1000A. However, this is not limitative. Other sorts of projectors can be employed, e.g., DLP projectors (DLP is a registered trademark by Texas Instrument) using a DMD (digital micro-mirror device).

What is claimed is:

1. An image projection system, comprising:
a control unit; and
a plurality of projectors to project an image, the plurality of projectors each including:
a parameter transmitting section to send, to the control unit, a parameter value having an effect upon an image quality of the image projected and varying with time;
a predetermined control data receiving section to receive, from the control unit, predetermined control data for use in adjusting the image quality; and
a control section to carry out control to adjust the image quality depending upon the predetermined control data;

the control unit including:

a parameter receiving section to receive the parameter value from each of the projectors;

a predetermined control data setting section to set the predetermined control data for at least one of individual ones of the plurality of projectors depending upon the parameter value received from the parameter transmitting section of each individual projector; and a predetermined control data transmitting section to transmit the predetermined control data to the individual projector from which the parameter value forming the basis for the setting of the predetermined control data was received.

2. The image projection system according to claim 1, the parameter value having an effect upon the image quality including at least one of brightness and contrast ratio of the image.

3. The image projection system according to claim 1, each of the plurality of projectors further comprising:

an image processing section to perform an image processing on input image data;

a liquid-crystal panel to form an image depending upon the image data on which the image processing has been performed; and a light-source lamp for use in projecting the formed image, the control section effecting the control of each projector by controlling driving to at least one of the image processing section and the light-source lamp, depending upon the predetermined control data.

4. The image projection system according to claim 3, the parameter value including at least one of a service time of liquid crystal panel, a temperature of liquid-crystal panel, a service time of light-source lamp and a temperature of light-source lamp.

5. The image projection system according to claim 3, the image processing section having a plurality of lookup tables for use in the image processing and capable of carrying out the image processing by selecting at least one of the plurality of lookup tables, the predetermined control data including data to select the lookup table.

6. The image projection system according to claim 3, the predetermined control data including data to adjust a drive power to the light-source lamp.

7. The image projection system according to claim 1, the predetermined control data setting section setting the predetermined control data such that the images projected by each of the plurality of projectors become equal in image quality one to another.

8. The image projection system according to claim 1, the control unit further comprising:

a request signal transmitting section to send, to each of the projectors, a request signal to request to send the parameter value, each of the projectors further having a request signal receiving section to receive the request signal, the parameter transmitting section sending the parameter value upon receiving the request signal.

9. The image projection system according to claim 8, the request signal transmitting section further sending the request signal at a predetermined time interval.

10. A control unit to control a plurality of projectors for projecting an image, comprising:

a parameter receiving section to receive from each of the plurality of projectors, a parameter value having an effect upon an image quality of the image projected and varying with time;

a predetermined control data setting section to set predetermined control data for at least one of individual ones of the plurality of projectors for use in adjusting the image quality at the individual ones of the projectors, depending upon the parameter value received from each of the individual projectors; and a transmitting section to send the predetermined control data to the individual projector from which the parameter value forming the basis for the setting of the predetermined control data was received.

11. A projector to project an image, comprising:

a parameter transmitting section to send, to a control unit, a parameter value having an effect upon an image quality of the image projected and varying with time;

a predetermined control data receiving section to receive predetermined control data for use in adjusting the image quality from the control unit; and a control section to effect predetermined control to adjust the image quality depending upon the predetermined control data.

12. A plurality of projectors to project an image, the plurality of projectors each comprising:

a parameter receiving section to receive, from another projector, a parameter value having an effect upon an image quality of the image projected and varying with time;

a predetermined control data setting section to set predetermined control data for use in adjusting the image quality at least at one of the other projector and the projector, depending upon the parameter value received from the other projector and the parameter value of the projector;

a control section to effect predetermined control to adjust the image quality depending upon the predetermined control data corresponding to the projector; and a predetermined control data transmitting section to send a corresponding one of the predetermined control data to the other projector.

13. A method of controlling an image projection system having a plurality of projectors to project an image and a control unit to control the plurality of projectors, comprising:

(a) sending, to the control unit, from each of the plurality of projectors, a parameter value having an effect upon an image quality of the image projected and varying with time;

(b) receiving the parameter value from each of the projectors, in the control unit;

(c) setting predetermined control data for use in adjusting the image quality at least at one of the plurality of the projectors depending upon the parameter value received from each of the projectors, in the control unit;

(d) sending the predetermined control data from the control unit to a corresponding one of the plurality of projectors, wherein the corresponding projector is sent the predetermined control data corresponding to the parameter value sent by the projector;

(e) receiving the predetermined control data from the control unit, in the corresponding projector; and (f) effecting predetermined control to adjust the image quality depending upon the predetermined control data, in each of the projectors receiving the predetermined control data.

14. A method of controlling a control unit to control a plurality of projectors to project an image, the method comprising:
(a) receiving, from each of the projectors, a parameter value having an effect upon a quality of the image projected and varying with time;
(b) setting predetermined control data for use in adjusting the image quality at least at one of the plurality of projectors depending upon the parameter value received from each of the projectors; and
(c) sending the predetermined control data from the control unit to a corresponding one of the plurality of projectors.

15. A method of controlling a plurality projectors to project an image, comprising:
(a) each of the plurality of projectors sending, to a control unit, a parameter value of each projector having an effect upon an image quality of the image projected and varying with time;
(b) receiving in at least each of the projectors predetermined control data for use in adjusting the image quality from the control unit, wherein a projector is sent predetermined control data corresponding to the parameter value sent by the projector; and
(c) controlling the image quality depending upon the predetermined control data.

16. A method of controlling a projector to project an image, comprising:
(a) receiving, from another projector, a parameter value having an effect upon an image quality of the image projected and varying with time;
(b) setting predetermined control data for use in adjusting the image quality at least at one of the other projector and the projector, depending upon the parameter value received from the other projector and the parameter value of the projector;
(c) effecting predetermined control to adjust the image quality depending upon the predetermined control data corresponding to the projector; and
(d) sending a corresponding one of the predetermined control data to the other projector.

17. A computer-readable recording medium containing a computer program to control a control unit for controlling a plurality of projectors to project an image, the computer program comprising instructions to:
receive, from each of the projectors, a parameter value having an effect upon an image quality of the image projected and varying with time;
set predetermined control data for use in adjusting the image quality at least at one of the projectors depending upon the parameter value received from each of the projectors; and
send the predetermined control data for each of the projectors to a corresponding one of the projectors for which the predetermined control data was set.

18. A computer-readable recording medium containing a computer program to control a plurality of projectors to project an image, the computer program comprising instructions to:
send to, a control unit, a parameter value from each of the projectors having an effect upon an image quality of the image projected and varying with time;
receive predetermined control data for at least one of the plurality of projectors for use in adjusting the image quality of such projectors from the control unit; and
effect predetermined control to adjust the image quality depending upon the predetermined control data.

19. A computer-readable recording medium containing a computer program to control a projector to project an image, the computer program comprising instructions to:
receive, from another projector, a parameter value having an effect upon an image quality of the image projected and varying with time;
set predetermined control data for use in adjusting the image quality at least at one of the other projector and the projector, depending upon the parameter value received from the other projector and the predetermined parameter value of the projector;
effect predetermined control to adjust the image quality depending upon the predetermined control data corresponding to the projector; and
send a corresponding one of the predetermined control data to the other projector.

* * * * *